(12) United States Patent
Christensen et al.

(10) Patent No.: US 7,716,908 B2
(45) Date of Patent: May 18, 2010

(54) SELF-CLEARING ROW UNIT AND STALK ROLL

(75) Inventors: Timothy Franklin Christensen, Moline, IL (US); Corwin Marcus Raymond Puryk, East Moline, IL (US); Janet Rose Willett, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/924,693

(22) Filed: Oct. 26, 2007

(65) Prior Publication Data
US 2009/0025353 A1 Jan. 29, 2009

(51) Int. Cl.
A01D 45/02 (2006.01)

(52) U.S. Cl. ........................................ 56/104

(58) Field of Classification Search ............... 56/104, 56/60, 94, 114, 500, 119, 66, 59, 105
See application file for complete search history.

(56) References Cited

U.S. PATENT DOCUMENTS

| 2,538,965 | A | | 1/1951 | Fergason | |
| 2,716,321 | A | * | 8/1955 | Schaaf et al. | 56/104 |
| 2,842,929 | A | | 7/1958 | Schultz et al. | |
| 3,304,702 | A | * | 2/1967 | Russell | 56/104 |
| 3,462,928 | A | * | 8/1969 | Schreiner et al. | 56/104 |
| 3,832,836 | A | * | 9/1974 | Anderson | 56/104 |
| 4,219,990 | A | * | 9/1980 | Hill | 56/14.2 |
| 4,791,778 | A | * | 12/1988 | Wilson | 56/106 |
| 5,040,361 | A | * | 8/1991 | Briesemeister | 56/52 |
| 5,404,699 | A | * | 4/1995 | Christensen et al. | 56/104 |
| 6,050,071 | A | * | 4/2000 | Bich et al. | 56/52 |
| 6,216,428 | B1 | * | 4/2001 | Becker et al. | 56/104 |

FOREIGN PATENT DOCUMENTS

| DE | 4201067 A1 | 7/1993 |
| EP | 0852109 A | 7/1998 |
| EP | 0943229 A | 9/1999 |

OTHER PUBLICATIONS

European Search Report dated Nov. 6, 2008 (4 pages).

* cited by examiner

Primary Examiner—Árpád Fábián-Kovács

(57) ABSTRACT

A row unit comprises a row unit gearbox with two shearing edges and two stalk rolls with corresponding shearing edges, wherein the stalk roll shearing edges shear against the gearbox shearing edges when the stalk rolls rotate during normal operation of the row unit, thereby chopping material that might otherwise be wrapped around the row unit gearbox and be jammed between the stalk rolls and the gearbox.

9 Claims, 4 Drawing Sheets

SELF-CLEARING ROW UNIT AND STALK ROLL

FIELD OF THE INVENTION

This invention relates to row units for corn heads of agricultural combines.

BACKGROUND OF THE INVENTION

In one common configuration, known in the prior art, corn heads comprise a laterally extending frame to which many row units are attached. The frame is configured to be supported on the front of an agricultural combine. Each row unit is configured to engage an individual row of crop plants, cutting the crop plant from the ground, and stripping the crop from the corn stalk. In one common row unit configuration, the row unit grasps the cornstalk, pulls it downward, and pulls the ears of corn off the stalk. These ears of corn are then provided to the threshing, separating, and cleaning portions of the agricultural combine to remove the individual kernels of corn. These kernels of corn are saved in a grain tank in the harvester.

Row units for corn heads typically have two forwardly extending rolls called "stalk rolls" that are disposed adjacent to each other. The stalk rolls are driven in rotation such that corn stalks trapped between them are pulled downward and ejected into the dirt below the corn head while the ears of corn are stripped off the stalk.

One problem with the row units for corn heads is their susceptibility to being jammed with shreds of plant matter, corn kernels, dirt, grass, or other materials on the ground. The row units skid along the ground, permitting all manner of contaminants to be introduced into the row unit.

A typical stalk roll may rotate at 1000 rpm as it travels along the ground only a few inches away from the dirt. Grass, weeds, broken corn stalks or other material may become jammed between the spinning stalk roll and the row unit gearbox on which it is mounted.

One solution to this problem has been to locate the stalk roll very closely to the gearbox itself providing a very small gap therebetween. Nonetheless, long fibrous plant material can become wrapped around the base of the stalk roll and wedged into this gap.

What is needed, therefore, is a row unit with an improved row unit gear box and stalk roll that reduced the likelihood of contamination. It is an object of this invention to provide such a row unit and stalk rolls.

SUMMARY OF THE INVENTION

In accordance with a first aspect of the invention a row unit for a corn head is provided, the row unit comprising a gearbox having two adjacent and forwardly extending stationary tubes; and first and second stalk rolls having a plurality of longitudinal knives, the stalk rolls being mounted for rotation on and concentric with the stationary tubes; wherein a portion of the gearbox adjacent to the first stalk roll has a first shearing edge and a portion of the gearbox adjacent to the second stalk roll has a second shearing edge, and further wherein the first shearing edge is disposed to shear a mating shearing edge on the first stalk roll and the second shearing edge is disposed to shear against a mating shearing edge on the second stalk roll.

In accordance with a second aspect of the invention, a stalk roll for a row unit of a corn head is provided, the row unit comprising a row unit gearbox having two forwardly extending stationary tubes disposed adjacent to each other with counter rotating helical protrusions disposed on the outer surface of the stationary tubes the row unit further comprising two stalk roll drive shafts, wherein a stalk roll drive shaft extends from each of the stationary tubes and is concentric therewith, the row unit gearbox further comprising a shearing edge disposed adjacent to the base of each stationary tube, the stalk roll comprising a stalk roll tube having a hollow interior configured to receive the stationary tube; and a plurality of longitudinally extending knives disposed on and extending generally radially outward from the stalk roll tube; wherein each of the plurality of longitudinally extending knives defines a stalk roll shearing edge along the leading surface of the knives that is configured to engage the shearing edge disposed adjacent to the base of the stationary tube on which the stalk roll is configured to be mounted, such that contaminating matter trapped between the stalk roll shearing edge and the gearbox shearing edge is sheared.

DESCRIPTION OF THE PREFERRED EMBODIMENT

Figure 1:
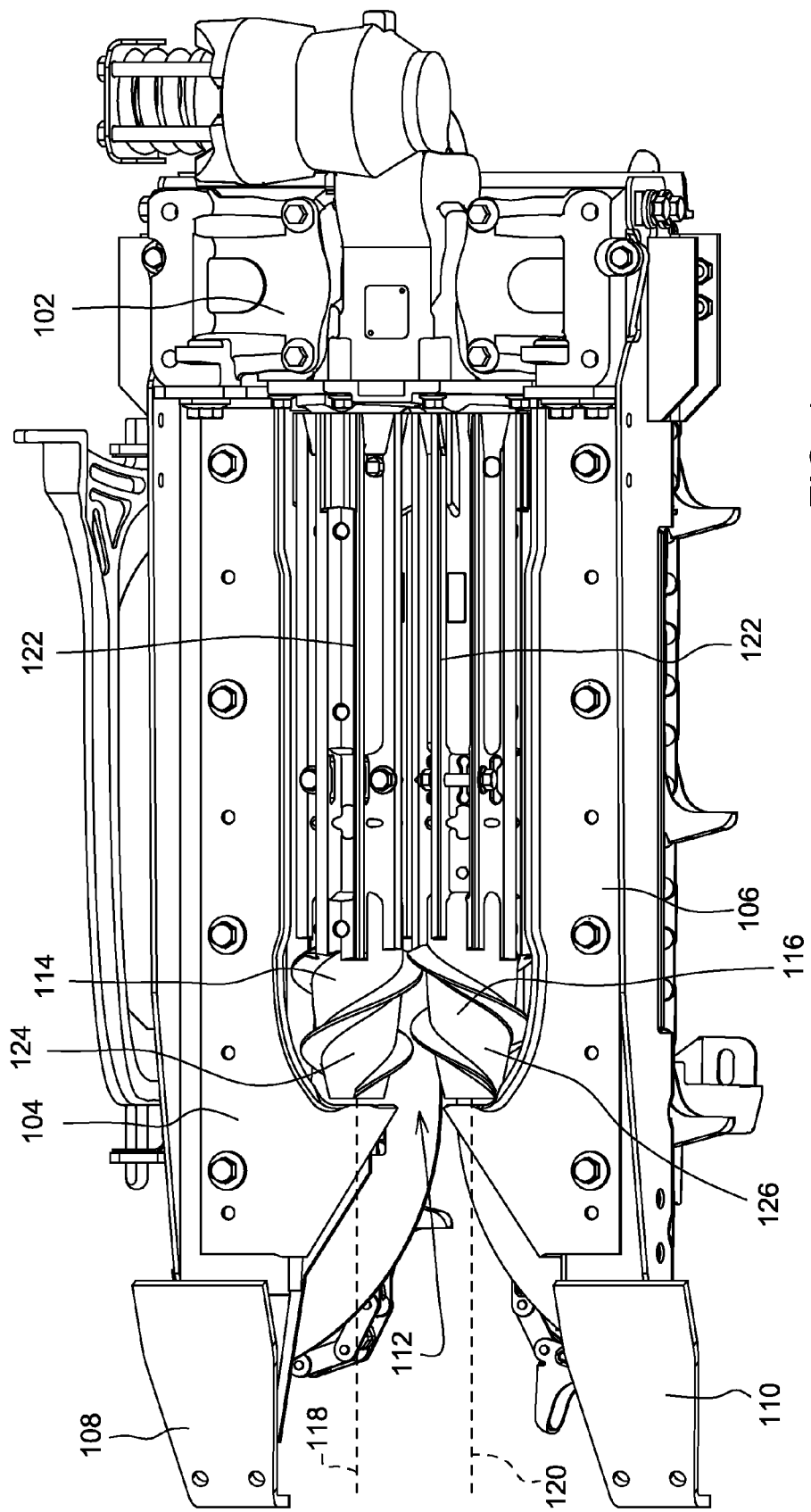
FIG. 1 is a bottom view of a row unit for a row crop harvester in accordance with this invention.

FIG. 1 is a bottom view of the corn had row unit 100 in accordance with the present invention. The row unit 100 includes a gearbox 102 to which two forwardly extending arms 104, 106 are bolted. The front end of each arm 104, 106 has a skid pad 108, 110 that is disposed to skid along the ground as the row unit and the harvester on which it is attached are propelled through the field. There is a gap 112 that extends between the two arms 104, 106 into which successive plants in the row of corn plants is drawn. On either side of this gap 112 are two stalk rolls 114, 116 that rotate about their longitudinal axes 118, 120 respectively. Corn plants entering into gap 112 between the two stalk rolls 114, 116 are grasped by the longitudinally extending knives 122 that extend from the surface of the stalk roll tube 123 that forms the body of each stalk roll. In the embodiment illustrated here, each stalk roll has eight of these longitudinal knives 122 spaced generally equidistantly about the circumference of the stalk roll tube 123. The forward end of each stalk roll 114, 116 has a helical flute 124, 126 that engage the cornstalk just as it enters into the gap and ensure that is drawn rearward in the gap between the two stalk rolls.

Figure 2:
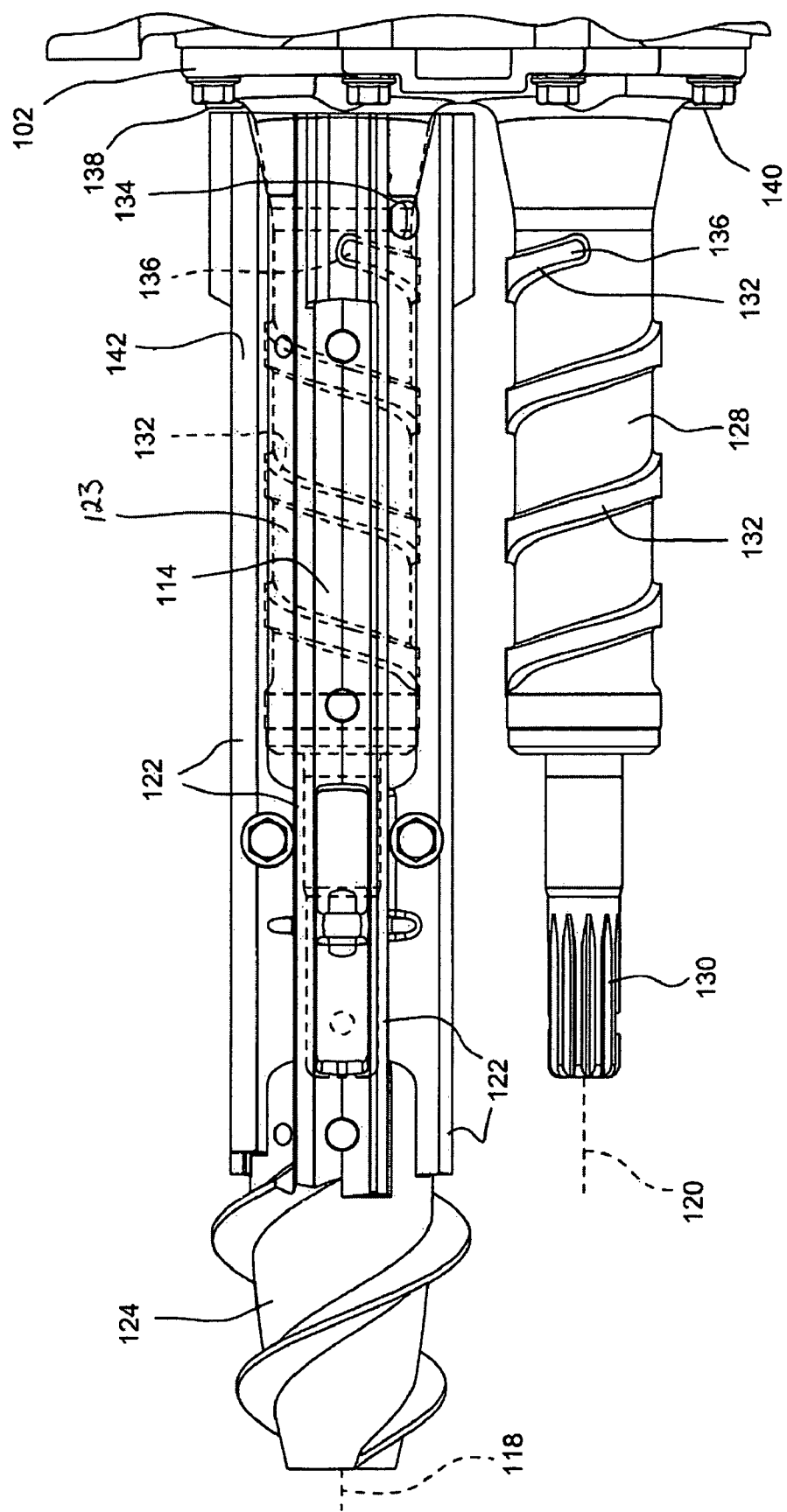
FIG. 2 is a bottom view of the row unit of FIG. 1 showing one stalk roll and the row unit gearbox on which it is mounted. The other stalk roll and the other components of the row unit have been removed for ease of illustration.
Figure 3:
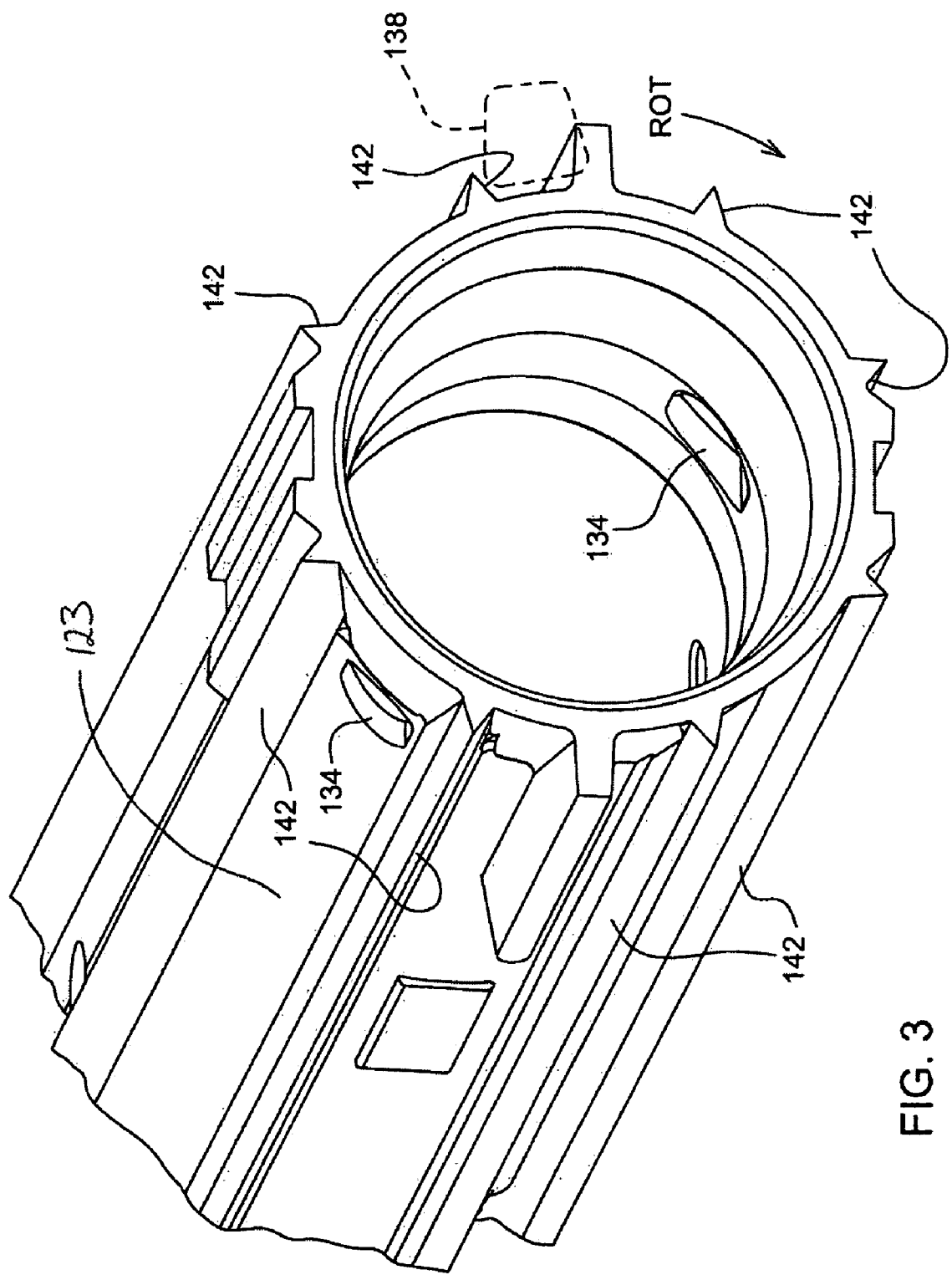
FIG. 3 is a perspective end view of the stalk roll of FIG. 2 showing the multiple knife arrangement, the flat end surface, and two clearance holes provided in the cylindrical body of the stalk roll.
Figure 4:
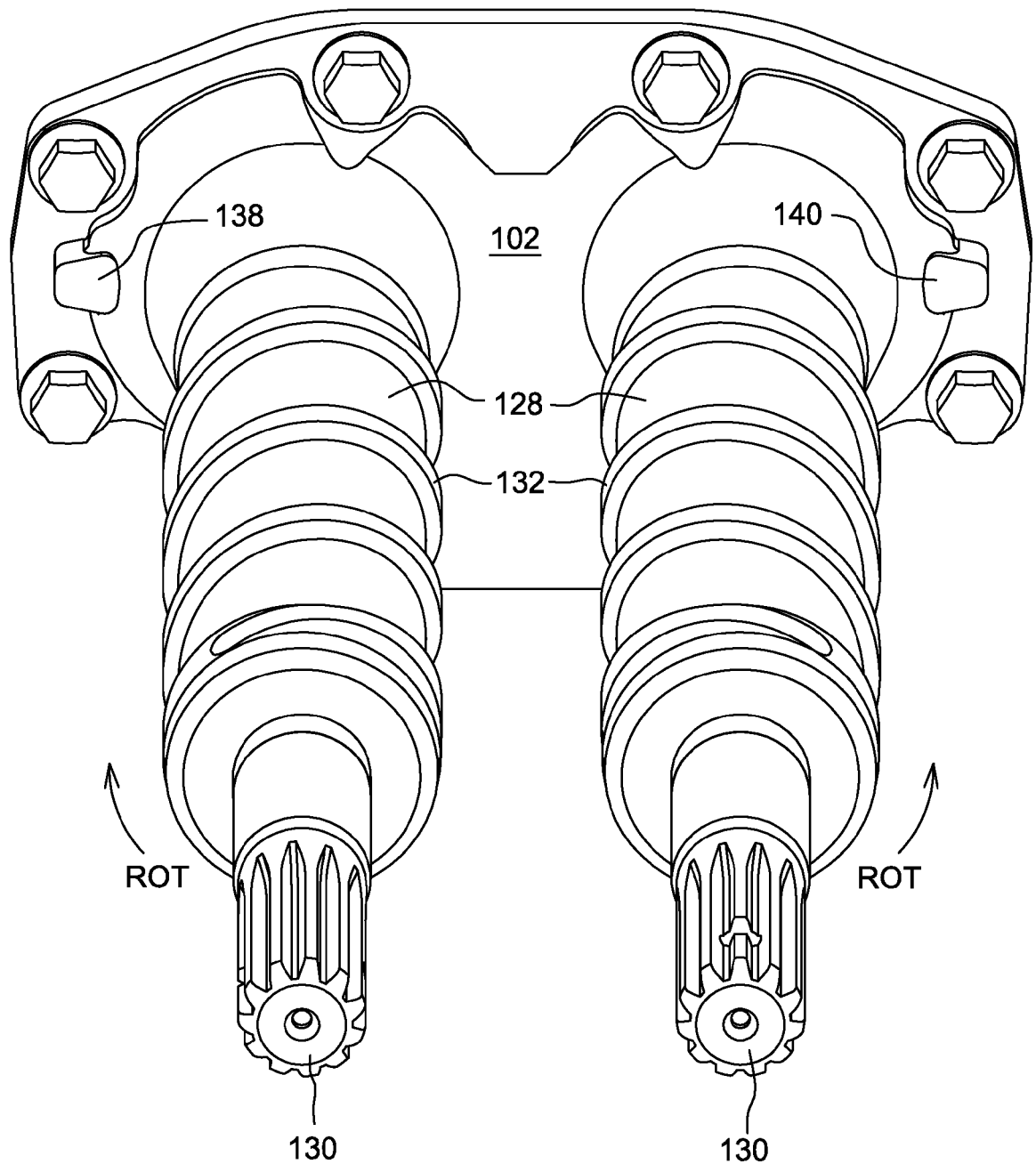
FIG. 4 is a front view of the row unit gearbox with both stalk rolls removed showing the shearing surface formed in a row unit gearbox adjacent to the base of the stalk rolls.

FIGS. 2-4 illustrate the row unit gearbox 102 with stalk roll 114 attached to the gearbox and with one stalk roll 116 removed for convenience of illustration. The forward portion of gearbox 102 includes a stationary tube 128 that extends forward into the open end of the stalk roll 116. In FIG. 2, the right stalk roll 116 has been removed to show the stationary tube 128 on which stalk roll 116 is mounted, and the rotating drive shaft 130 that is coupled to stalk roll 116 to drive it in rotation about its longitudinal axis 120.

The outer surface of stationary tube 128 has a helical protrusion 132 disposed on the cylindrical outer surface of stationary tube 128 that extends substantially the entire length of the stationary tube 128. The helical protrusion is twisted such that material trapped between the stalk roll 116 and stationary tube 128 is pushed to the rear (i.e. toward the gearbox 102). An identical stationary tube drive shaft, and helical protrusion is disposed within stalk roll 114. The helical protrusion on the stationary tube within stalk roll 114, however, has an opposite direction of twist since it rotates in the opposite direction as stalk roll 116. It also pulls contaminants toward the rear of stalk roll 114.

Both of the stalk rolls 114, 116 have two through holes 134 disposed on diametrically opposite sides of the stalk roll tube 123 adjacent to the end 136 of their respective helical protrusions. By locating holes 134 at the end 136 of the helical protrusions, material that is forced backwards by the relative rotation of the stalk rolls with respect to their helical protrusions is pushed to holes 134, where the centrifugal force generated by the rotating stalk roll causes the material to be ejected. This insures that the forward portion of the stalk roll is kept clear of contaminated material.

Gearbox 102 includes at least one shearing edge 138 that extends forward toward the right end (in FIG. 2) of the stalk roll 114 and extends generally radially outward from the axis of rotation 118 of stalk roll 114. Shearing edge 138 is positioned very closely to the rear end of the stalk roll such that material caught between the stalk roll 114 and the shearing edge 138 is sheared off and thereby prevented from wrapping around the end of the stalk roll and becoming jammed between the stalk roll and the base of the stationary tube. An identical mirror image shearing edge 140 is similarly located at the base of stalk roll 116 to similarly shear material that is caught between stalk roll 116 and shearing edge 140.

Referring now to FIGS. 3 and 4, we can see that each of the eight longitudinal knives 122 of stalk roll 114 has a generally radially extending leading edge 142. Stalk roll 116 similarly has eight knives with leading edges arranged in mirror fashion which function exactly the same. It is this leading edge 142 that engages a generally radially extending shearing edge 138 (shown in FIG. 3 as a dashed line) to shear material in the gap between the two edges. Every time stalk roll 114 completes a single revolution, there are eight successive shearing strokes for each of the eight forward edges 142 to shear against shearing edge 138 of gearbox 102. Shearing edge 140 shears identically against the forward leading edges of stalk roll 116, but in mirror fashion. Stalk rolls 114, 116 typically rotate at 1000 rpm. Thus, there are 8000 shearing strokes per minute (average) when the row unit is being driven through the field. At this speed, material that begins to be wrapped around the end of stalk roll 114 is usually sheared before it can wrap completely around and become jammed into the gap defined between the end of stalk roll 114 and the stationary tube that is disposed inside stalk roll 114. Stalk roll 116 is identically arranged as the end of stalk roll 114, but in a mirror arrangement to provide the same shearing strokes between the leading edges of its eight longitudinal knives 122 and shearing edge 141 gearbox 102.

On occasion, some plant matter or dirt will manage, even though it is sheared, to enter the space between the end of stalk rolls 114, 116 and the stationary tubes on which the stalk rolls are mounted. When this happens, the material tends to migrate forward in an axial direction toward the forward tip of the stalk rolls as the stalk rolls rotate. Holes 134 in the stalk rolls 114, 116 permit this material to be expelled as it migrates forward and prevents it from accumulating inside the stalk rolls.

These two separate mechanisms, (1) the holes formed in the stalk rolls that interact with the helical protrusions to clear the forward ends of the stalk rolls, and (2) the shearing action provided by the interaction of the generally radially extending edges 142 on the end of the stalk rolls that interact with the generally radially extending shearing edges 138, 140 both serve to keep the stalk roll and gearbox and the gap in between cleaned out and clear.

The invention claimed is:

1. A row unit for a row crop harvester comprising:
   a gearbox having two adjacent and forwardly extending stationary tubes; and
   first and second stalk rolls having a plurality of longitudinal knives, the stalk rolls being mounted for rotation on and concentric with the stationary tubes;
   a portion of the gearbox adjacent to the first stalk roll has a first shearing edge and a portion of the gearbox adjacent to the second stalk roll has a second shearing edge, and the first shearing edge is disposed to shear against a mating shearing edge of the first stalk roll and the second shearing edge is disposed to shear against a mating shearing edge on the second stalk roll, and the gearbox first and second shearing edges extend a first distance from the gearbox, whereas gearbox fasteners extend a second distance from the gearbox and being smaller than the first distance.

2. The row unit of claim 1, in which the mating shearing edge in the first stalk roll is a generally radially extending leading edge formed by an end surface of the first stalk roll and a leading surface of one of the longitudinal knives, and the mating shearing edge on the second stalk roll is a generally radially extending leading edge formed by an end surface of the second stalk roll and a leading surface of one of the longitudinal knives.

3. The row unit of claim 2, where each of the longitudinal knives of the first stalk roll are configured to shear against the first shearing edge and each of the longitudinal knives of the second stalk roll are configured to shear against the second shearing edge.

4. The row unit of claim 1, in which each of the stationary tubes has a helical protrusion extending from its outer surface that is configured to conduct contaminated matter rearward, and further in which each of the stalk rolls has a least one hole through its outer wall to release contaminated matter conducted rearward by the helical protrusions of the stationary tube on which that stalk roll is mounted.

5. A stalk roll for a row unit of a row crop harvester, the row unit comprising a row unit gearbox having two forwardly extending stationary tubes disposed adjacent to each other with counter rotating helical protrusions disposed on the outer surface of the stationary tubes the row unit further comprising two stalk roll drive shafts, a stalk roll drive shaft extends from each of the stationary tubes and is concentric therewith, the row unit gearbox further comprising a shearing edge disposed adjacent to the base of each stationary tube, the stalk roll comprising:
   a stalk roll tube having a hollow interior configured to receive the stationary tube; and
   a plurality of longitudinally extending knives disposed on and extending generally radially outward from the stalk roll tube;
   each of the plurality of longitudinally extending knives defines a stalk roll shearing edge along the leading surface of the knives that is configured to engage the shearing edge disposed adjacent to the base of the stationary tube on which the stalk roll is configured to be mounted, such that contaminating matter trapped between the stalk roll shearing edge and the gearbox shearing edge is sheared, and the gearbox shearing edge extends a first distance from the gearbox, whereas gearbox fasteners extend a second distance from the gearbox and being smaller than the first distance.

6. The row unit of claim 5, in which the stalk roll shearing edge of the stalk roll is a generally radially extending leading edge formed by an end surface of the first stalk roll and a leading surface of one of the longitudinal knives.

7. The row unit of claim 6, in which the leading edge of each of the longitudinal knives of the stalk roll is configured to shear against the shearing edge of the row unit gearbox.

8. The row unit of claim 5, in which a hole is formed in a side wall of the stalk roll tube of the stalk roll in a location adjacent to one end of the helical protrusion when the stalk roll is mounted on the row unit gearbox.

9. The row unit of claim 8, in which the hole is sized to release contaminating matter conducted rearward to the end of the helical protrusion.

* * * * *